(12) United States Patent
Chien

(10) Patent No.: US 10,732,450 B2
(45) Date of Patent: Aug. 4, 2020

(54) DISPLAY PANEL AND MANUFACTURING PROCESS THEREOF

(71) Applicants: HKC Corporation Limited, Shenzhen (CN); Chongqing HKC Optoelectronics Technology Co., Ltd., Chongqing (CN)

(72) Inventor: Chung-Kuang Chien, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

(*) Notice: Subject to any disclaimer, the term of this patent is extended or adjusted under 35 U.S.C. 154(b) by 93 days.

(21) Appl. No.: 15/744,796

(22) PCT Filed: May 12, 2017

(86) PCT No.: PCT/CN2017/084121
§ 371 (c)(1),
(2) Date: Jan. 13, 2018

(87) PCT Pub. No.: WO2018/107654
PCT Pub. Date: Jun. 21, 2018

(65) Prior Publication Data
US 2019/0011762 A1    Jan. 10, 2019

(30) Foreign Application Priority Data
Dec. 16, 2016  (CN) .......................... 2016 1 11754247

(51) Int. Cl.
*G02F 1/1335* (2006.01)
*G02F 1/1362* (2006.01)
(Continued)

(52) U.S. Cl.
CPC ...... *G02F 1/133514* (2013.01); *G02F 1/1339* (2013.01); *G02F 1/1343* (2013.01);
(Continued)

(58) Field of Classification Search
None
See application file for complete search history.

(56) References Cited

U.S. PATENT DOCUMENTS

2006/0227277 A1* 10/2006 Oh ...................... G02F 1/13458
349/149
2007/0103635 A1* 5/2007 Tawaraya ............ G02F 1/13394
349/156
(Continued)

FOREIGN PATENT DOCUMENTS

CN         2916694 Y       6/2007
CN        202929337 U      5/2013
(Continued)

OTHER PUBLICATIONS

Yunli Liu, the International Searching Authority written comments, Sep. 2017, CN.

*Primary Examiner* — Edward J Glick
*Assistant Examiner* — David Y Chung

(57) ABSTRACT

The present application discloses a display panel and a manufacturing process thereof. The display panel includes a first substrate and a second substrate. The first substrate is provided with a first transparent conductive layer. The second substrate is disposed opposite to the first substrate, and the second substrate is provided with a second transparent conductive layer. A plurality of transparent conductive blocks are spacedly positioned between the first transparent conductive layer and the second transparent conductive layer, and the transparent conductive blocks are electrically connected to the first transparent conductive layer and the second transparent conductive layer. The transparent conductive blocks are made from a same material as the first transparent conductive layer; or the transparent conductive blocks are made from a same material as the second transparent conductive layer; or the transparent
(Continued)

conductive blocks are made from a same material as the first transparent conductive layer and the second transparent conductive layer. And the transparent conductive blocks are integrally formed with the first transparent conductive layer; or the transparent conductive blocks are integrally formed with the second transparent conductive layer; or the transparent conductive blocks are integrally formed with the first transparent conductive layer and the second transparent conductive layer.

16 Claims, 7 Drawing Sheets

(51) Int. Cl.
G02F 1/1343 (2006.01)
G02F 1/1339 (2006.01)
(52) U.S. Cl.
CPC .... *G02F 1/13439* (2013.01); *G02F 1/136286* (2013.01); *G02F 2001/13398* (2013.01); *G02F 2201/123* (2013.01)

(56) References Cited

U.S. PATENT DOCUMENTS

| | | | |
|---|---|---|---|
| 2008/0129901 A1* | 6/2008 | You | G02F 1/13718 349/33 |
| 2008/0188023 A1 | 8/2008 | Shin et al. | |
| 2012/0113339 A1* | 5/2012 | Park | G06F 3/0412 349/33 |
| 2014/0168585 A1* | 6/2014 | Huang | G02F 1/133516 349/106 |
| 2016/0253026 A1* | 9/2016 | Long | G03F 7/20 345/174 |
| 2017/0269732 A1* | 9/2017 | Chang | G06F 3/044 |

FOREIGN PATENT DOCUMENTS

| | | |
|---|---|---|
| CN | 203217211 U | 9/2013 |
| CN | 104281319 A | 1/2015 |
| CN | 106126000 A | 11/2016 |
| JP | 2012108299 A | 6/2012 |

* cited by examiner

DISPLAY PANEL AND MANUFACTURING PROCESS THEREOF

TECHNICAL FIELD

The present application relates to the technical field of displays, and more particularly to a display panel and a manufacturing process thereof.

BACKGROUND

Liquid crystal display apparatuses have numerous advantages, such as a thin body, power saving, no radiation, etc., and are widely used. Most liquid crystal display apparatuses in the current market are backlit liquid crystal display apparatuses, each including a liquid crystal panel and a backlight module. Working principle of the liquid crystal panel is that liquid crystals are put in two parallel glass substrates, and a driving voltage is applied to two glass substrates to control rotation of the liquid crystals, to refract light rays of the backlight module to generate a picture.

Thin film transistor-liquid crystal display apparatuses (TFT-LCD apparatuses) currently maintain a leading status in the display field because of low power consumption, excellent picture quality, high production yield, and other properties. Similarly, the TFT-LCD apparatus comprises a liquid crystal panel and a backlight module. The liquid crystal panel comprises a color filter substrate (CF substrate) and a thin film transistor substrate (TFT substrate), and transparent electrodes on relative inner sides of the above substrates. A layer of liquid crystals (LC) is positioned between two substrates. The liquid crystal panel changes the polarized state of light by controlling direction of the LCs through an electric field, for penetration and obstruction of a light path via a polarized plate to display.

In manufacturing existing liquid crystal panels, an Au ball needs to be positioned between the CF substrate and the TFT substrate, a first indium tin oxide (ITO) layer is arranged at one side of the color filter substrate, and a second ITO layer is arranged at one side of the TFT substrate. When the CF substrate and the TFT substrate are assembled, the Au ball is positioned between the first ITO layer and the second ITO layer, and the first ITO layer is connected to the second ITO layer through the Au ball, so that an electrical path is formed between the CF substrate and the TFT substrate. Multiple manufacturing processes are needed in realizing electrical connection between the first ITO layer and the second ITO layer, thereby increasing production costs, and decreasing production efficiency.

SUMMARY

The aim of the present application is to provide a display panel capable of saving manufacturing processes.

Furthermore, the present application further provides a manufacturing process for the display panel, to save the manufacturing processes.

The aim of the present application is achieved by the following technical solution.

According to one aspect of the present application, the present application discloses a display panel comprising:

a first substrate provided with a first transparent conductive layer;

a second substrate disposed opposite to the first substrate and provided with a second transparent conductive layer; and a plurality of transparent conductive blocks spacedly positioned between the first transparent conductive layer and the second transparent conductive layer, wherein the transparent conductive blocks are electrically connected to the first transparent conductive layer and the second transparent conductive layer, and the transparent conductive blocks are made from a same material as the first transparent conductive layer, or the transparent conductive blocks are made from a same material as the second transparent conductive layer; or the transparent conductive blocks are made from a same material as the first transparent conductive layer and the second transparent conductive layer; and the transparent conductive blocks are integrally formed with the first transparent conductive layer, or the transparent conductive blocks are integrally formed with the second transparent conductive layer, or the transparent conductive blocks are integrally formed with the first transparent conductive layer and the second transparent conductive layer.

The first transparent conductive layer is made of a transparent conductive photoresist, or the second transparent conductive layer is made of a transparent conductive photoresist, or the first transparent conductive layer and the second transparent conductive layer are made of a transparent conductive photoresist. The transparent conductive photoresist has not only good conduction, but also has good light transmission. The transparent conductive photoresist in the present application may be formed by adding metal particles into a transparent photoresist to realize the conduction through the metal particles.

The first substrate comprises a color filter layer, and the first conductive layer is disposed on the color filter layer. The plurality of spaced transparent conductive blocks protrude out of the first transparent conductive layer, and are made from a same material as the first transparent conductive layer, and integrally formed with the first transparent conductive layer. This is a specific embodiment of the present application for arranging the transparent conductive blocks. The first transparent conductive layer is made from a same material as the transparent conductive blocks, and the first transparent conductive layer and the transparent conductive blocks are integrally formed, so that the first transparent conductive layer and the transparent conductive blocks may be formed in a same manufacturing process. When the first substrate and the second substrate are assembled, the transparent conductive blocks are matched with the second transparent conductive layer, thereby electrically connecting the first transparent conductive and the second transparent conductive layer.

The first transparent conductive layer and the transparent conductive blocks are formed by the transparent conductive photoresist in the same manufacturing process. The transparent conductive photoresist has not only good conduction, but also good light transmission. The transparent conductive photoresist in the present application may be formed by adding metal particles into a transparent photoresist, realizing the conduction through the metal particles.

The second transparent conductive layer is made of the transparent conductive photoresist. The transparent conductive photoresist has not only good conduction, but also good light transmission. The transparent conductive photoresist in the present application may be formed by adding metal particles into a transparent photoresist to realize the conduction through the metal particles. In the present application, the second transparent conductive layer is also made of the transparent conductive photoresist, so that the first transparent conductive layer, the second transparent conductive layer and the transparent conductive blocks are made of the transparent conductive photoresist, thereby saving the manufacturing processes and facilitating material obtaining and production.

The second substrate comprises a pixel electrode layer, data lines for charging the pixel electrode and scan lines for controlling the pixel electrode, and the pixel electrode is made of the transparent conductive photoresist. The transparent conductive photoresist has not only good conduction, but also good light transmission. The transparent conductive photoresist in the present application may be formed by adding metal particles into a transparent photoresist to the conduction through the metal particles. In the present application, the pixel electrode is also made of the transparent conductive photoresist, so that the first transparent conductive layer, the second transparent conductive layer, the transparent conductive blocks and the pixel electrode are made of the transparent conductive photoresist, thereby saving the manufacturing processes and facilitating material obtaining and production Outer surfaces of the transparent conductive blocks are arc-shaped, and the sizes of the transparent conductive blocks gradually increase from the top to the middle portion and gradually decrease from the middle portion to the bottom. Each transparent conductive block of the arc-shaped structure is better in conduction, and when the first substrate and the second substrate are assembled, a connection between the transparent conductive blocks of the arc structure and the second transparent conductive layer is better.

The transparent conductive blocks comprise first semi-transparent conductive blocks and second semi-transparent conductive blocks, wherein the first semi-transparent conductive blocks and the first transparent conductive layer are integrally formed, the second semi-transparent conductive blocks and the second transparent conductive layer are integrally formed. And the first transparent conductive layer, the first semi-transparent conductive blocks, the second transparent conductive layer and the second semi-transparent conductive blocks are made of the transparent conductive photoresist. This is another specific way of the present application for arranging the transparent conductive blocks. The first transparent conductive layer and the first semi-transparent conductive blocks may be formed in the same manufacturing process, and the second transparent conductive layer and the second semi-transparent conductive blocks may be formed in another manufacturing process. When the first substrate and the second substrate are assembled, the first semi-transparent conductive blocks and the second semi-transparent conductive blocks are mutually matched to form a complete transparent conductive block, thereby realizing the electrical connection between the first transparent conductive layer and the second transparent conductive layer. The manufacturing processes are also saved, and the production efficiency is increased. The materials are convenient to get, and the production and material cost is decreased.

The size of each first semi-transparent conductive block gradually decreases from the top to the bottom, the size of the second semi-transparent conductive block gradually decreases from the top to the bottom, and the top of each first semi-transparent conductive block is adaptive to the top of each second semi-transparent conductive block. This is a specific embodiment for arranging the first semi-transparent conductive blocks and the second semi-transparent conductive blocks, so that the contact effect is better and the conduction is better when the first semi-transparent conductive blocks are matched with the second semi-transparent conductive blocks.

The plurality of transparent conductive blocks are respectively arranged at the first transparent conductive layer and the second transparent conductive layer. The transparent conductive blocks on the first transparent conductive layer and the transparent conductive blocks on the second transparent conductive layer are spacedly arranged. This is another specific way of the present application for arranging the transparent conductive blocks. Some transparent conductive blocks are integrally formed with the first transparent conductive layer, and the rest transparent conductive blocks are integrally formed with the second transparent conductive layer. When the first substrate and the second substrate are assembled, some transparent conductive blocks and the rest transparent conductive blocks are spacedly arranged, thereby realizing the electrical connection between the first transparent conductive layer and the second transparent conductive layer. The manufacturing processes are also saved, and the production efficiency is increased. The materials are convenient to get, and the production and material cost is decreased.

Wherein the transparent conductive blocks are of cylindrical structures.

Wherein the transparent conductive blocks are of conical structures.

The second transparent conductive layer is made of the indium tin oxide. The cooperation of the indium tin oxide and the transparent conductive blocks realizes the electrical connection between the indium tin oxide and the first transparent conductive layer.

A manufacturing process for the above display panel is provided. The manufacturing process comprises the following steps:

laying a transparent conductive photoresist on a first substrate or a second substrate; and processing the transparent conductive photoresist into a first transparent conductive layer or a second transparent conductive layer, and transparent conductive blocks integrally formed with the first transparent conductive layer or the second transparent conductive layer through use of a same mask The step of laying the transparent conductive photoresist on the first substrate or the second substrate comprises:

laying a color filter layer on the first substrate; and laying a transparent conductive photoresist on the color filter layer.

The step of processing the transparent conductive photoresist into the first transparent conductive layer or the second transparent conductive layer and the transparent conductive blocks integrally formed with the first transparent conductive layer or the second transparent conductive layer through use of the same mask comprises:

doping the transparent conductive photoresist with a photo-initiator; and adopting a same light source to illuminate a mask, and filtering out two light rays of different wavelengths through use of the mask to control the photo-initiator, so that the transparent conductive photoresist has different shrinkages, forming the first transparent conductive layer and the transparent conductive blocks.

The transparent conductive photoresist has not only good conduction, but also good light transmission. The transparent conductive photoresist in the present application may be formed by adding metal particles into a transparent photoresist, realizing the conduction through the metal particles.

Furthermore, in the present application, the transparent conductive photoresist is doped with the photo-initiator, and the photo-initiator is cooperated with the light rays of a preset wavelength, so that the photo-initiator and the transparent conductive photoresist have a cross-linking reaction through the illumination of the light rays of the preset wavelength to form different shrinkages. In the present application, the two light rays of different wavelengths of the same light source penetrate through the mask, and the two different light rays are respectively cooperated with the photo-initiator, so that the photo-initiator and the transparent conductive photoresist have the cross-linking reaction to form different shrinkages, forming the first transparent conductive layer and the transparent conductive blocks, or forming the second transparent conductive layer and the conductive blocks. Therefore, the present application can complete the first transparent conductive layer and the transparent conductive blocks, or complete the second transparent conductive layer and the conductive blocks in the same manufacturing process, thereby saving the manufacturing processes, and facilitating material obtaining and production.

The manufacturing processes for the display panel in the prior art are complex. The opposite sides of two substrates are respectively provided with two ITO layers, an Au ball is positioned between the two ITO layers after the two ITO layers are well arranged, and the Au ball connects the two ITO layers, thereby realizing electrical connection between the two ITO layers. Compared with the prior art, the present application has the technical effects that:

The display panel of the present application is provided with the plurality of spaced transparent conductive blocks between the first transparent conductive layer of the first substrate and the second transparent conductive layer of the second substrate, and the transparent conductive blocks are electrical connected to the first transparent conductive layer and the second transparent conductive layer. The transparent conductive blocks are made from a same material as the first transparent conductive layer, or the transparent conductive blocks are made from a same material as the second transparent conductive layer; or the transparent conductive blocks are made from a same material as the first transparent conductive layer and the second transparent conductive layer. And the transparent conductive blocks are integrally formed with the first transparent conductive layer, or the transparent conductive blocks are integrally formed with the second transparent conductive layer, or the transparent conductive blocks are integrally formed with the first transparent conductive layer and the second transparent conductive layer. That is to say, the first transparent conductive layer is made from a same material as the transparent conductive blocks and is integrally formed with the transparent conductive blocks directly. Or the second transparent conductive layer is made from a same material as the transparent conductive blocks and is directly integrally formed with the transparent conductive blocks. Or the transparent conductive blocks are spacedly disposed on the first transparent conductive layer and the second transparent layer, some transparent conductive blocks are made from a same material as the first transparent conductive blocks, and are integrally formed with the first transparent conductive layer, and the rest transparent conductive blocks are made from a same material as the second transparent conductive layer, and are integrally formed with the second transparent conductive layer. Therefore, the first transparent conductive layer and the transparent conductive blocks or the second transparent conductive layer and the transparent conductive blocks may be simultaneously formed in the same technological manufacturing process. When the first substrate and the second substrate are assembled, the electrical connection between the first transparent conductive layer and the second transparent conductive layer may be realized through the transparent conductive blocks. Compared with the technology that multiple technological manufacturing processes are needed to form the two ITO layers and dispose the Au ball between the two ITO layers, the manufacturing processes for disposing the Au ball are reduced, the manufacturing process for the display panel is saved, and the production efficiency is increased. Moreover, the cost of the Au ball is high. The transparent conductive blocks of the present application are made from the same material as the first conductive layer or the second conductive layer, thereby simplifying manufacturing processes, facilitating material obtaining and decreasing the costs.

DETAILED DESCRIPTION OF THE INVENTION

Figure 1:
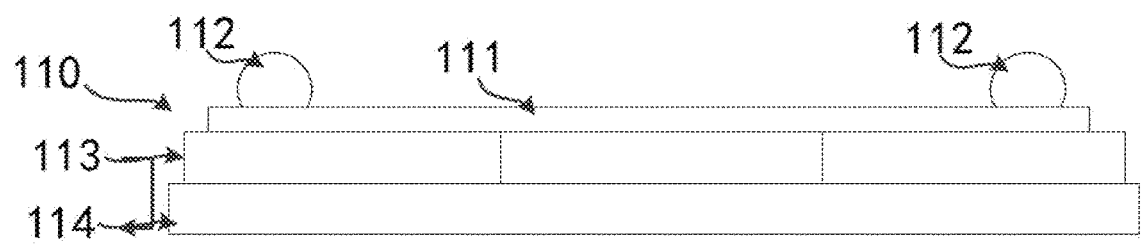
FIG. 1 is a structural schematic diagram of a first substrate of an embodiment of the present application.

Specific structure and function details disclosed herein are only representative and are used for the purpose of describing exemplary embodiments of the present application. However, the present application may be specifically achieved in many alternative forms and shall not be interpreted to be only limited to the embodiments described herein.

It should be understood in the description of the present application that terms such as "central", "horizontal", "upper", "lower", "left", "right", "vertical", "horizontal", "top", "bottom", "inner", "outer", etc. indicate direction or position relationships shown based on the drawings, and are only intended to facilitate the description of the present application and the simplification of the description rather than to indicate or imply that the indicated apparatus or element must have a specific direction or constructed and operated in a specific direction, and therefore, shall not be understood as a limitation to the present application. In addition, the terms such as "first" and "second" are only used for the purpose of description, rather than being understood to indicate or imply relative importance or hint the number of indicated technical features. Thus, the feature limited by "first" and "second" can explicitly or impliedly include one or more features. In the description of the present application, the meaning of "a plurality of" is two or more unless otherwise specified. In addition, the term "comprise" and any variant are intended to cover non-exclusive inclusion.

It should be noted in the description of the present application that, unless otherwise specifically regulated and defined, terms such as "installation," "bonded," and "bonding" shall be understood in broad sense, and for example, may refer to fixed bonding or detachable bonding or integral bonding; may refer to mechanical bonding or electrical bonding; and may refer to direct bonding or indirect bonding through an intermediate medium or inner communication of two elements. For those of ordinary skill in the art, the meanings of the above terms in the present application may be understood according to concrete conditions.

The terms used herein are intended to merely describe concrete embodiments, not to limit the exemplary embodiments. Unless otherwise noted clearly in the context, singular forms "one" and "single" used herein are also intended to comprise plurals. It should also be understood that the terms "comprise" and/or "include" used herein specify the existence of stated features, integers, steps, operation, units and/or assemblies, not excluding the existence or addition of one or more other features, integers, steps, operation, units, assemblies and/or combinations of these.

Referring to FIG. 1 to FIG. 13, a display panel and a manufacturing process for the display panel of embodiments of the present application are described below.

The present application is further described below in detail in combination with FIG. 1 to FIG. 13 and specific embodiments.

Figure 2:
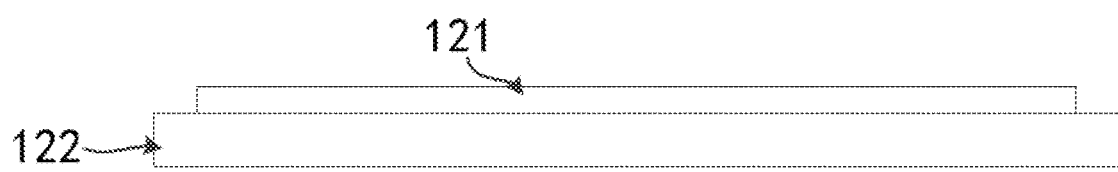
FIG. 2 is a structural schematic diagram of a second substrate of an embodiment of the present application.
Figure 3:
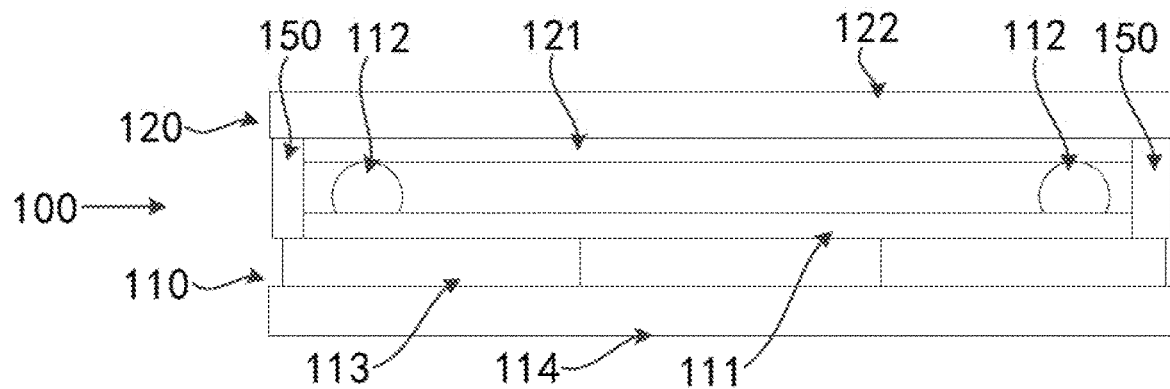
FIG. 3 is a structural schematic diagram of a display panel of an embodiment of the present application.
Figure 4:
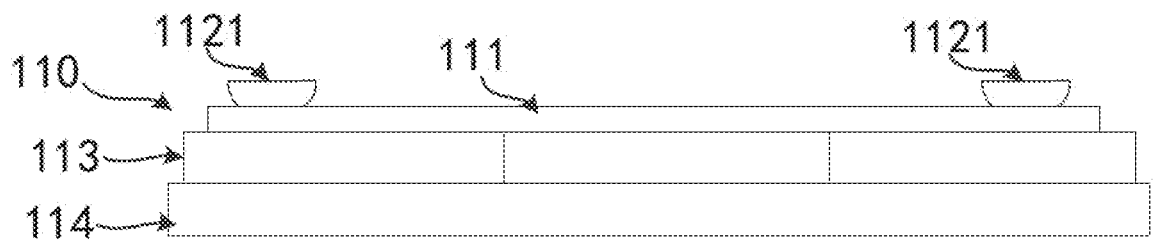
FIG. 4 is a structural schematic diagram of a first substrate of an embodiment of the present application.
Figure 5:
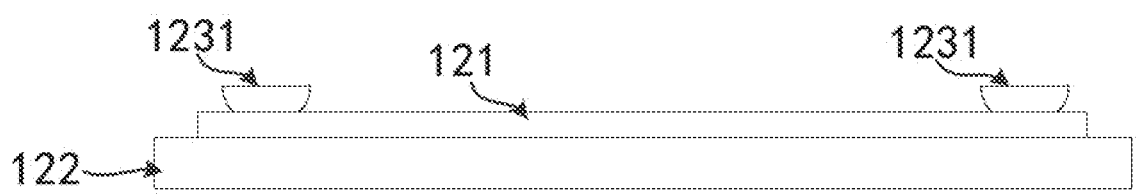
FIG. 5 is a structural schematic diagram of a second substrate of an embodiment of the present application.
Figure 6:
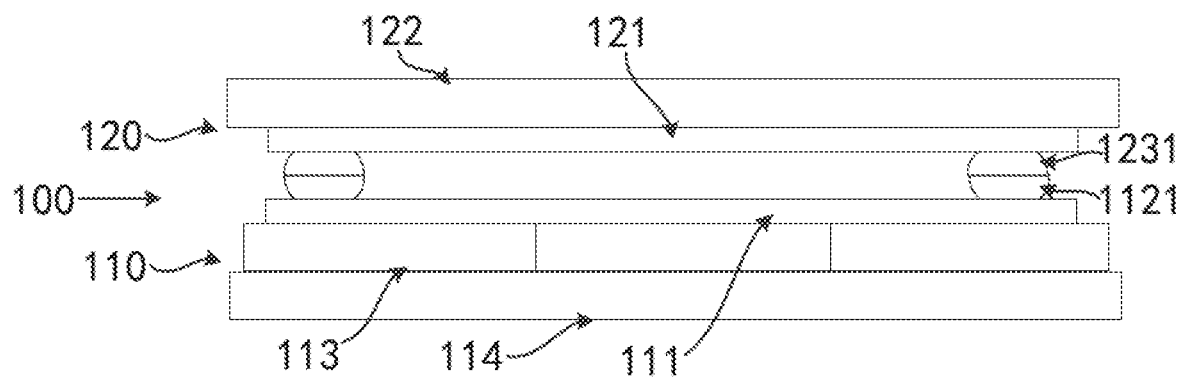
FIG. 6 is a structural schematic diagram of a display panel of an embodiment of the present application.
Figure 7:
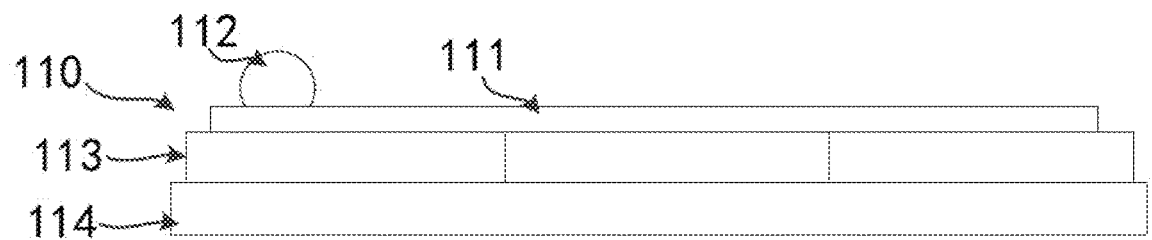
FIG. 7 is a structural schematic diagram of a first substrate of an embodiment of the present application.
Figure 8:
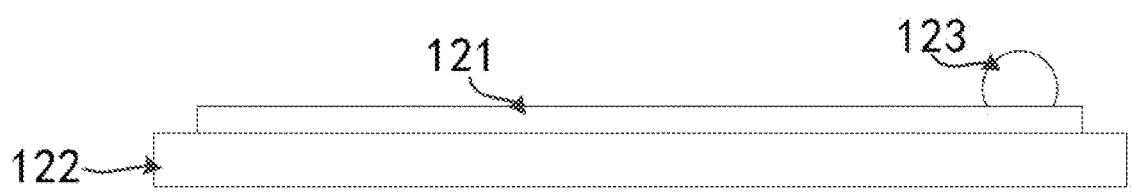
FIG. 8 is a structural schematic diagram of a second substrate of an embodiment of the present application.
Figure 9:
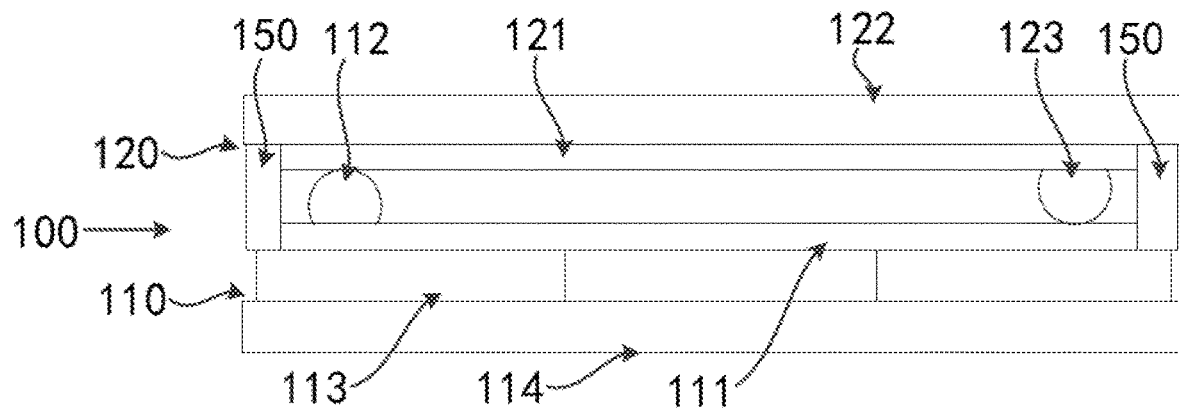
FIG. 9 is a structural schematic diagram of a display panel of an embodiment of the present application.

In an embodiment of the present application, as shown in FIG. 1 to FIG. 9, FIG. 1 is a structural schematic diagram of a first substrate of an embodiment of the present application, FIG. 2 is a structural schematic diagram of a second substrate of an embodiment of the present application, FIG. 3 is a structural schematic diagram of a display panel of an embodiment of the present application, FIG. 4 is a structural schematic diagram of a first substrate of an embodiment of the present application, FIG. 5 is a structural schematic diagram of a second substrate of an embodiment of the present application, FIG. 6 is a structural schematic diagram of a display panel of an embodiment of the present application, FIG. 7 is a structural schematic diagram of a first substrate of an embodiment of the present invention, FIG. 8 is a structural schematic diagram of a second substrate of an embodiment of the present application, and FIG. 9 is a structural schematic diagram of a display panel of an embodiment of the present application. The display panel 100 comprises a first substrate 110 and a second substrate 120. The first substrate 110 is provided with a first transparent conductive layer 111. The second substrate 120 is disposed opposite to the first substrate 110, and the second substrate 120 is provided with a second transparent conductive layer 121. A plurality of transparent conductive blocks (first transparent conductive blocks 112, or second transparent conductive blocks 123, or first semi-transparent conductive blocks 1121 and second semi-transparent conductive blocks 1231) are spacedly positioned between the first transparent conductive layer 111 and the second transparent conductive layer 121, and the transparent conductive blocks are electrical connected to the first transparent conductive layer 111 and the second transparent conductive layer 121. The transparent conductive blocks are made from a same material as the first transparent conductive layer 111, or the transparent conductive blocks are made from a same material as the second transparent conductive layer 121, or the transparent conductive blocks are made from a same material as the first transparent conductive layer 111 and the second transparent conductive layer 121. And the transparent conductive blocks are integrally formed with the first transparent conductive layer 111, or the transparent conductive blocks are integrally formed with the second transparent conductive layer 121, or the transparent conductive blocks are integrally formed with the first transparent conductive layer 111 and the second transparent conductive layer 121.

The display panel of embodiments of the present application is provided with a plurality of spaced transparent conductive blocks between the first transparent conductive layer of the first substrate and the second transparent conductive layer of the second substrate, and the transparent conductive blocks are electrical connected to the first transparent conductive layer and the second transparent conductive layer. The transparent conductive blocks are made from a same material as the first transparent conductive layer, or the transparent conductive blocks are made from a same material as the second transparent conductive layer, or the transparent conductive blocks are made from a same material as the first transparent conductive layer and the second transparent conductive layer. And the transparent conductive blocks are integrally formed with the first transparent conductive layer, or the transparent conductive blocks are integrally formed with the second transparent conductive layer, or the transparent conductive blocks are integrally formed with the first transparent conductive layer and the second transparent conductive layer. That is to say, the first transparent conductive layer is made from a same material as the transparent conductive blocks, and is integrally formed with the transparent conductive blocks directly, or the second transparent conductive layer is made from a same material as the transparent conductive blocks, and is integrally formed with the transparent conductive blocks directly; or the transparent conductive blocks are spacedly disposed on the first transparent conductive layer and the second transparent layer, some transparent conductive blocks are made from a same material as the first transparent conductive blocks, and are integrally formed with the first transparent conductive layer, and the rest of the transparent conductive blocks are made from a same material as the second transparent conductive layer, and are integrally formed with the second transparent conductive layer. Therefore, the first transparent conductive layer and the transparent conductive blocks or the second transparent conductive layer and the transparent conductive blocks may be simultaneously formed in the same manufacturing process. When the first substrate and the second substrate are assembled, electrical connection between the first transparent conductive layer and the second transparent conductive layer may be realized through the transparent conductive blocks. Compared with the technology that requires multiple manufacturing processes to form the two ITO layers and dispose the Au ball between the two ITO layers, thereby reducing the technological process for disposing the Au ball, saving manufacturing process of the display panel, and increasing production efficiency. Moreover, the cost of the Au ball is high. The transparent conductive blocks of the present application are made from the same material as the first conductive layer or the second conductive layer, thereby realizing simple manufacturing process, facilitating material obtaining, and decreasing cost.

Figure 10:
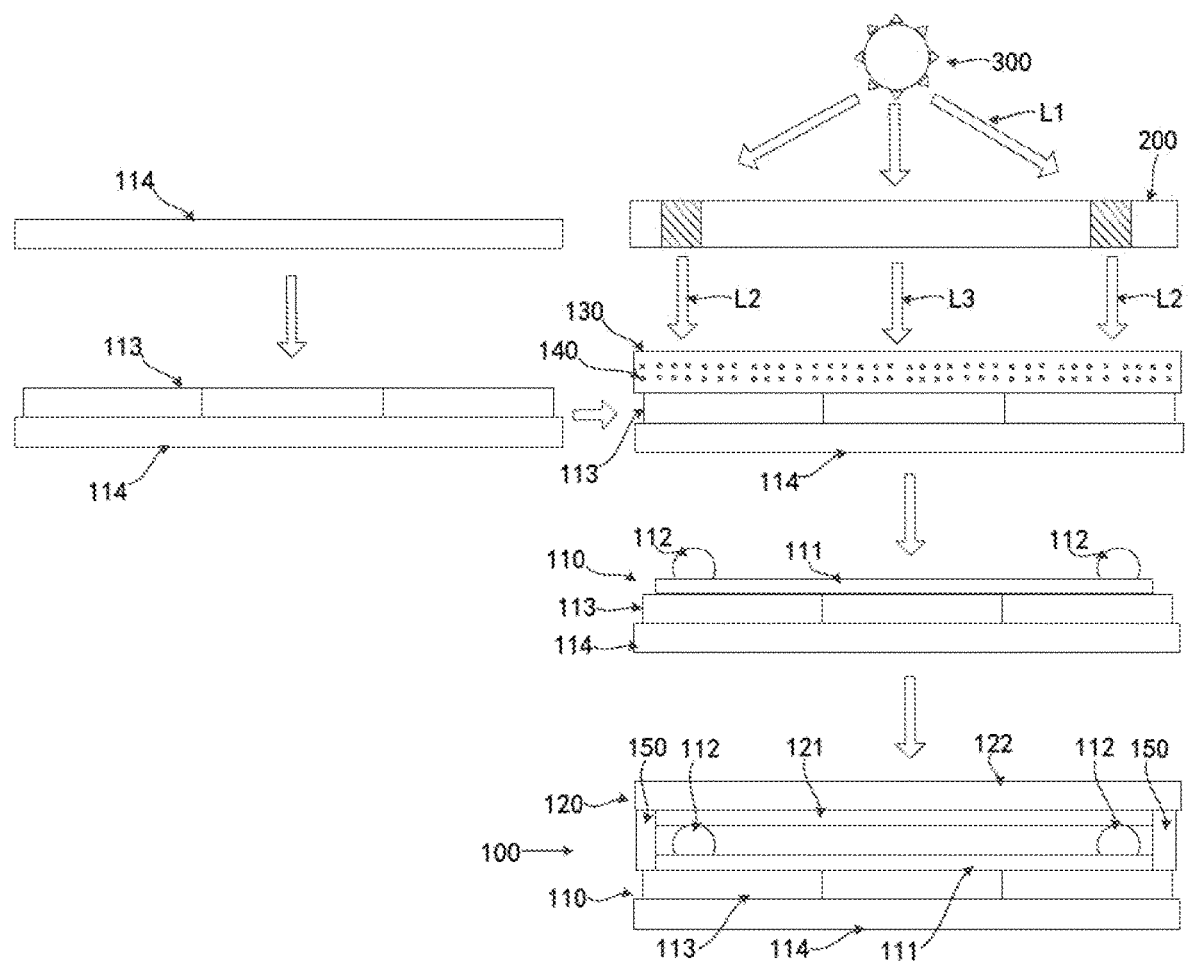
FIG. 10 is a schematic diagram of procedures of a manufacturing process for a display panel of an embodiment of the present application.

In the present embodiment, specifically in combination with FIG. 10, FIG. 10 is a schematic diagram of procedures of a manufacturing process for a display panel of an embodiment of the present application. In the present embodiment, the first transparent conductive layer 111 is made of the transparent conductive photoresist 130, or the second transparent conductive layers 121 is made of the transparent conductive photoresist 130, or the first transparent conductive layers 111 and the second transparent conductive layers 121 are made of the transparent conductive photoresist 130. The transparent conductive photoresist not only has a good conduction, but also has good light transmission. The transparent conductive photoresist of the present application may be formed by adding metal particles into a transparent photoresist, realizing conduction through the metal particles.

Preferably, as shown in FIG. 1 and FIG. 3, and in combination with FIG. 10, in the present embodiment, the first transparent conductive layer 11, the second transparent conductive layer 121 and the transparent conductive blocks are made of the transparent conductive photoresist 130. Thus, the first transparent conductive layer 111, the second transparent conductive layer 121 and the transparent conductive blocks are made of the transparent conductive photoresist, thereby saving manufacturing processes and facilitating material obtaining and production. The plurality of spaced transparent conductive blocks in embodiments of the present application protrude out of the first transparent conductive layer 111, and the plurality of spaced transparent conductive blocks are made from the same material (the material is the transparent conductive photoresist) as the first transparent conductive layer 111, and are integrally formed with the first transparent conductive layer 111. In FIG. 1 to FIG. 3, the plurality of transparent conductive blocks disposed on the first substrate 110 are defined as the first transparent conductive blocks 112. This is a specific embodiment of the present application for arranging the transparent conductive blocks. The first transparent conductive layer is made from a same material (the material is the transparent conductive photoresist 130) as the first transparent conductive blocks, and are integrally formed, so that the first transparent conductive layer and the first transparent conductive blocks may be formed in the same manufacturing process. When the first substrate 110 and the second substrate 120 are assembled, the first transparent conductive blocks and the second transparent conductive layer are matched, so that the first transparent conductive layer is electrically connected to the second transparent conductive layer.

However, it shall be noted that in the present embodiment, the second transparent conductive layer may also be made of other materials. For example, the second transparent conductive layer is made of indium tin oxide, and the cooperation of the indium tin oxide and the first transparent conductive blocks 112 realizes the electrical connection between the indium tin oxide layer and the first transparent conductive layer 111.

However, it shall be noted that the above is a specific embodiment for arranging the transparent conductive blocks, and the transparent conductive blocks in the present embodiment can also have other arrangements as follows:

Example 1 as shown in FIG. 4 to FIG. 6, and in combination with FIG. 10, the transparent conductive blocks comprise first semi-transparent conductive blocks 1121 and second semi-transparent conductive blocks 1231. The first semi-transparent conductive blocks 1121 and the first transparent conductive layer 111 are integrally formed, and the second semi-transparent conductive blocks 1231 and the second transparent conductive layer 121 are integrally formed. The first transparent conductive layer, the first semi-transparent conductive blocks, the second transparent conductive layer and the second semi-transparent conductive blocks are made of the transparent conductive photoresist 130. This is another specific way of the present application for arranging the transparent conductive blocks. The first transparent conductive layer and the first semi-transparent conductive blocks may be formed in the same manufacturing process, that is, the first transparent conductive layer and the first semi-transparent conductive blocks may be formed in the manufacturing process for the first substrate. The second transparent conductive layer and the second semi-transparent conductive blocks may be formed in another same manufacturing process, that is, the second transparent conductive layer and the second semi-transparent conductive blocks may be formed in a manufacturing process for the second substrate. When the first substrate and the second substrate are assembled, the first semi-transparent conductive blocks and the second semi-transparent conductive blocks are mutually matched to form a complete transparent conductive block, thereby realizing the electrical connection between the first transparent conductive layer and the second transparent conductive layer, saving manufacturing processes, increasing production efficiency, facilitating material obtaining and production, and material decreasing costs.

As shown in FIG. 4 to FIG. 6, size of each first semi-transparent conductive block 1121 gradually decreases from the top to the bottom, size of each second semi-transparent conductive block 1231 gradually decreases from the top to the bottom, and the top of each first semi-transparent conductive block is adaptive to the top of each second semi-transparent conductive block. This is a specific embodiment for arranging the first semi-transparent conductive blocks and the second semi-transparent conductive blocks, so that the contact is better and conduction is better when the first semi-transparent conductive blocks are matched with the second semi-transparent conductive blocks. In order to further improve the contact between the first semi-transparent conductive blocks and the second semi-transparent conductive blocks, convex points are disposed on the tops of the first semi-transparent conductive blocks, and correspondingly, concave points matched with the convex points are disposed on the tops of the second semi-transparent conductive blocks.

As shown in FIG. 4 to FIG. 6, the first semi-transparent conductive blocks and the second semi-transparent conductive blocks are respectively consistent in size. It shall be noted that the first semi-transparent conductive blocks are set to be bigger than the second semi-transparent conductive blocks, or the first semi-transparent conductive blocks are set to be smaller than the second semi-transparent conductive blocks. The definition for the specific structures of the first semi-transparent conductive blocks and the second semi-transparent conductive blocks herein is not limited thereto.

Example 2 as shown in FIG. 7 to FIG. 9, and in combination with FIG. 10, the plurality of transparent conductive blocks are respectively disposed on the first transparent conductive layer 111 and the second transparent conductive layer 121, and the transparent conductive blocks (which are same as the transparent conductive blocks in FIG. 1 to FIG. 3, so that the transparent conductive blocks are also defined as the first transparent conductive blocks 112) on the first transparent conductive layer 111 and the transparent conductive blocks (which are defined as the second transparent conductive blocks 123) on the second transparent conductive layer 121 are spacedly arranged. This is another specific embodiment of the present application for arranging the transparent conductive blocks. Some transparent conductive blocks (the first transparent conductive blocks 112) are integrally formed with the first transparent conductive layer 111, and the rest of the transparent conductive blocks (the second transparent conductive blocks 123) are integrally formed with the second transparent conductive layer 121. When the first substrate 110 and the second substrate 120 are assembled, some transparent conductive blocks (the first transparent conductive blocks 112) and the rest of the transparent conductive blocks (the second transparent conductive blocks 123) are spacedly arranged, thereby realizing electrical connection between the first transparent conductive layer 111 and the second transparent conductive layer 121, saving manufacturing processes, increasing the production efficiency, facilitating material obtaining and production, and material decreasing costs.

It shall be noted that the specific structure of the transparent conductive blocks of embodiments of the present application is not limited to an arc-shaped structure, and the transparent conductive blocks may also be arranged in a cylindrical structure, a conical structure, and the like.

Example 3 the transparent conductive blocks are only integrally formed with the second transparent conductive layer. The specific structure and the effect are same as those in FIG. 1 to FIG. 3. Specifically referring to FIG. 1 to FIG. 3 and the above description, the detail description is not repeated herein.

In the present embodiment, further, the first substrate 110 also comprises a first carrier 114 and a color filter layer 113. The color filter layer 113 is disposed on the first carrier 114, the first transparent conductive layer 111 is disposed on the color filter layer, and the plurality of spaced first transparent conductive blocks 112 protrude out of the first transparent conductive layer 111. The second substrate 120 also comprises a second carrier 122, a pixel electrode layer, data lines for charging the pixel electrode, and scan lines for controlling the pixel electrode, and the second transparent conductive layer 121 is disposed on the second carrier 122. The pixel electrode layer, the data lines and the scan lines are arranged in a display area of the display panel 100.

The color filter layer in the present embodiment includes but is not limited to a photoresist R, a photoresist G, and a photoresist B.

The first carrier and the second carrier may be glass substrates which have a good light transmission and convenient to arrange. Of course, it shall be noted that the first carrier and the second carrier in the present embodiment are not limited thereto. For example, the first carrier and the second carrier are flexible substrates.

The pixel electrode is made of the transparent conductive photoresist 130. In embodiments of the present application, the pixel electrode is also made of the transparent conductive photoresist 130, so that the first transparent conductive layer 111, the second transparent conductive layer 121, the first transparent conductive blocks 112 and the pixel electrode are made of the transparent conductive photoresist 130, thereby saving the manufacturing processes and facilitating material obtaining and production.

Outer surfaces of the first transparent conductive blocks 112 are arc-shaped, and sizes of the transparent conductive blocks 112 gradually increase from the top to the middle, and gradually decrease from the middle to the bottom. The transparent conductive blocks of the arc structure have better conduction. When the first substrate 110 and the second substrate 120 are assembled, the connection between the transparent conductive blocks 112 of the arc structure and the second transparent conductive layer 121 is better. However, it shall be noted that the first transparent conductive blocks 112 in the present embodiment may also be arranged in other structures, such as a cylindrical structure, a conical structure, and the like.

The display panel in the present embodiment is a liquid crystal panel. The first substrate 110 is a color filter substrate. The second substrate 120 is a thin film transistor substrate. It shall be noted that the display panel in the present embodiment is not limited thereto.

Figure 11:
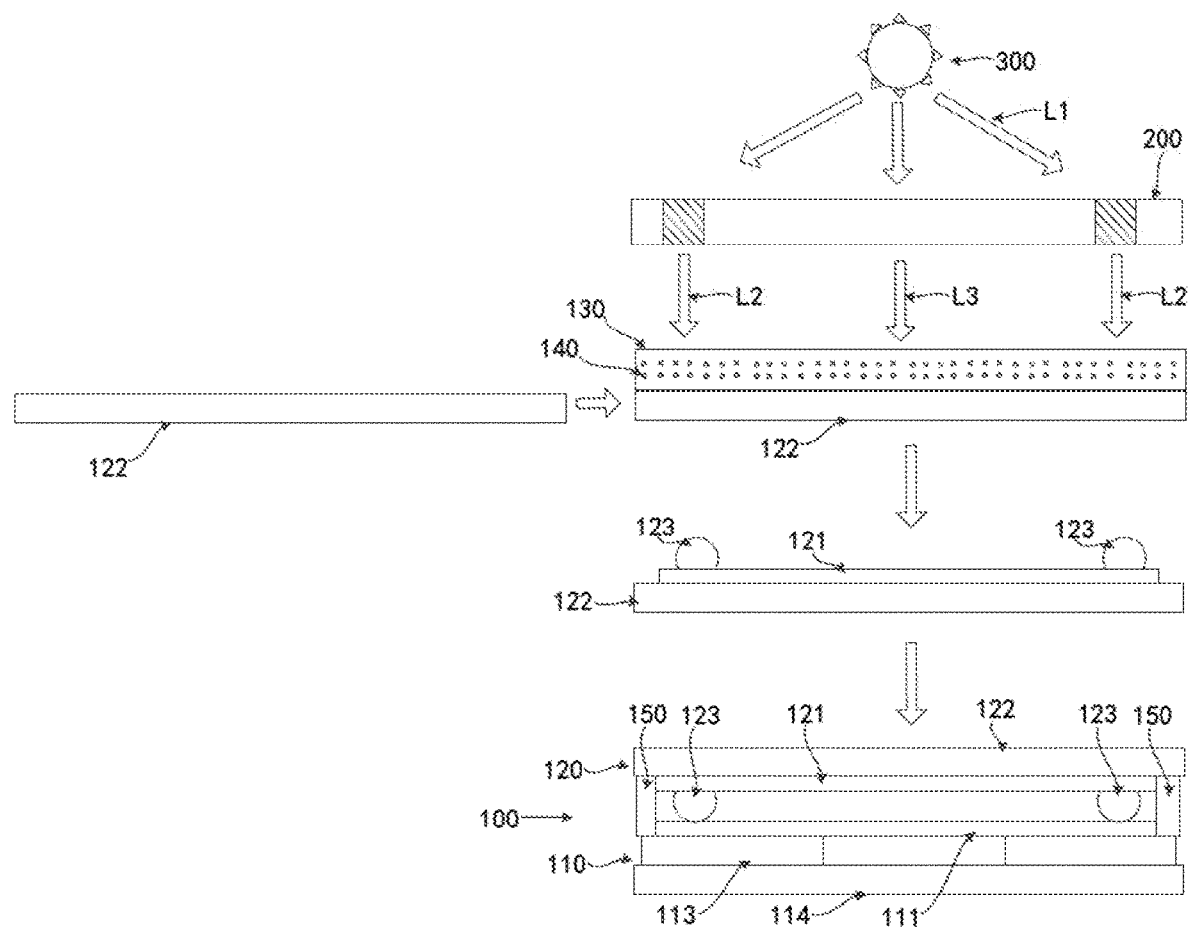
FIG. 11 is a schematic diagram of procedures of a manufacturing process for a display panel of an embodiment of the present application.
Figure 12:
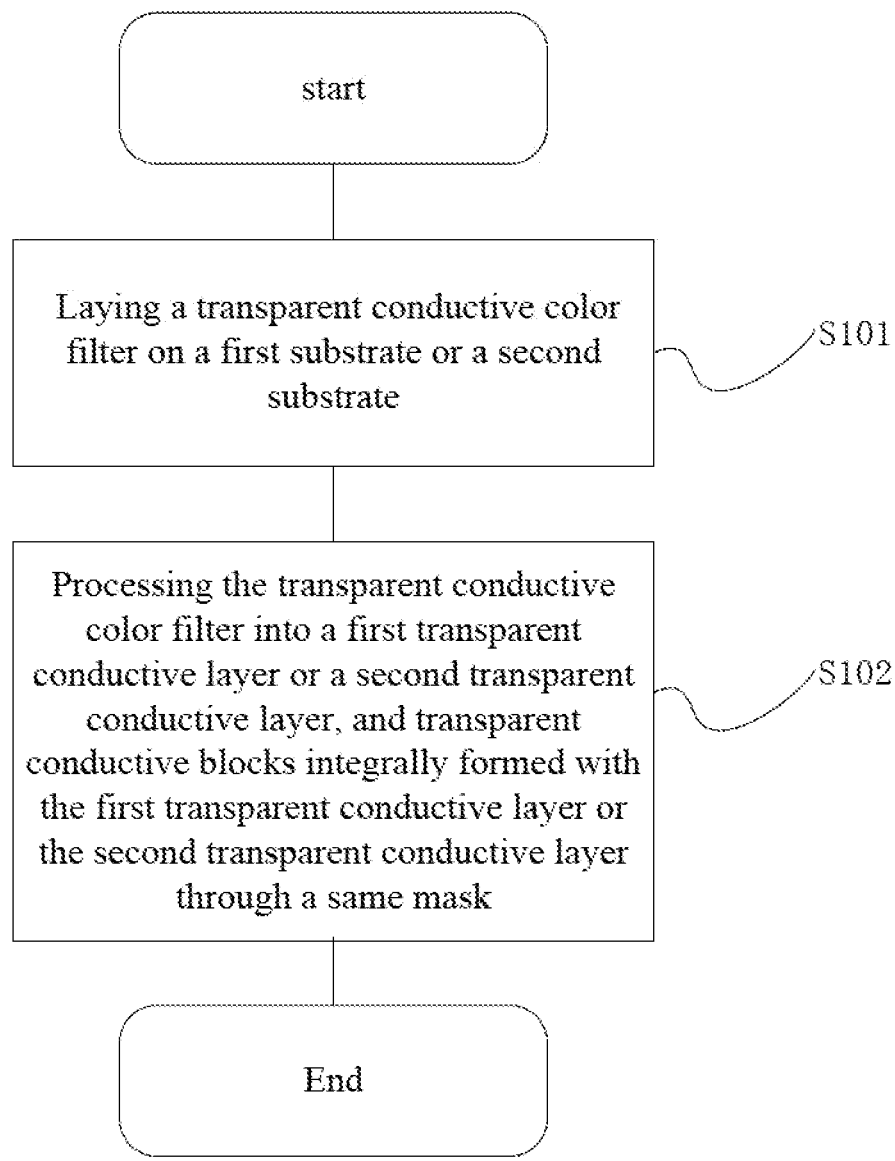
FIG. 12 is a flow chart of a manufacturing process for a display panel of an embodiment of the present application.

In an embodiment of the present application, as shown in FIG. 10 to FIG. 12, FIG. 10 is a schematic diagram of procedures of a manufacturing process for a display panel of an embodiment of the present application. FIG. 11 is a schematic diagram of procedures of a manufacturing process for a display panel of an embodiment of the present application. FIG. 12 is a flow chart of a manufacturing process for the display panel of an embodiment of the present application.

In FIG. 11, the manufacturing process for the display panel of the present embodiment comprises a step S101 and a step S102.

Specifically, in the step S101, a transparent conductive photoresist is laid on the first substrate or the second substrate.

In the step S102, the transparent conductive photoresist is processed into a first transparent conductive layer or a second transparent conductive layer, and transparent conductive blocks integrally formed with the first transparent conductive layer or the second transparent conductive layer through a same mask (such as a gray-tone mask or a half tone mask).

The display panel in embodiments of the present application can refer to FIG. 1 to FIG. 9. The display panel comprises a first substrate and a second substrate. The first substrate is provided with a first transparent conductive layer. The second substrate is provided with a second transparent conductive layer. Refer to the above embodiments for the first substrate and the second substrate which are not described in detail herein.

In embodiments of the present application, the transparent conductive photoresist is laid on the first substrate or the second substrate. The transparent conductive photoresist is processed through the same mask technology, so that the transparent conductive photoresist forms the first transparent conductive layer or the second transparent conductive layer, and the transparent conductive blocks are integrally formed with the first transparent conductive layer or the second transparent conductive layer. The transparent conductive blocks are electrically connected to the first transparent conductive layer and the second transparent conductive layer, and the transparent conductive blocks are integrally formed with the first transparent conductive layer, or the transparent conductive blocks are integrally formed with the second transparent conductive layer, or the transparent conductive blocks are integrally formed with the first transparent conductive layer and the second transparent conductive layer. That is to say, the first transparent conductive layer is directly integrally formed with the transparent conductive blocks; or the second transparent conductive layer is directly integrally formed with the transparent conductive blocks, or the transparent conductive blocks are spacedly disposed on the first transparent conductive layer and the second transparent layer, some transparent conductive blocks are integrally formed with the first transparent conductive layer, and the rest of the transparent conductive blocks are integrally formed with the second transparent conductive layer. Therefore, the first transparent conductive layer and the transparent conductive blocks or the second transparent conductive layer and the transparent conductive blocks are simultaneously formed in the same manufacturing process. When the first substrate and the second substrate are assembled, the electrical connection between the first transparent conductive layer and the second transparent conductive layer may be realized through the transparent conductive blocks. Compared with the technology that multiple manufacturing processes are needed to form the two ITO layers and dispose the Au ball between the two ITO layers, the manufacturing process for disposing the Au ball is reduced, the manufacturing process for the display panel is saved, and the production efficiency is increased. Moreover, the cost of the Au ball is high. In the embodiment of the present application, the transparent conductive blocks and the first conductive layer or the second conductive layer are made of the transparent conductive photoresist, thereby simplifying manufacturing process, facilitating material obtaining, and decreasing costs.

In the present embodiment, the first transparent conductive layer, the second transparent conductive layer and the transparent conductive blocks may be formed directly by the transparent conductive photoresist, and the transparent conductive photoresist has not only good conduction, but also good light transmission. In embodiments of the present application, the transparent conductive photoresist may be formed by adding metal particles into a transparent photoresist, realizing the conduction through the metal particles.

The step of laying the transparent conductive photoresist on the first substrate or the second substrate comprises:

laying a color filter layer on the first substrate, and laying the transparent conductive photoresist on the color filter layer.

The step of processing the transparent conductive photoresist into the first transparent conductive layer or the second transparent conductive layer, and the transparent conductive blocks integrally formed with the first transparent conductive layer or the second transparent conductive layer through the same mask comprises:

doping the transparent conductive photoresist with a photo-initiator, and illuminating a mask using a same light source, and filtering two light rays of different wavelengths through the mask to control the photo-initiator, so that the transparent conductive photoresist has different shrinkages, forming the first transparent conductive layer and the transparent conductive blocks.

Figure 13:
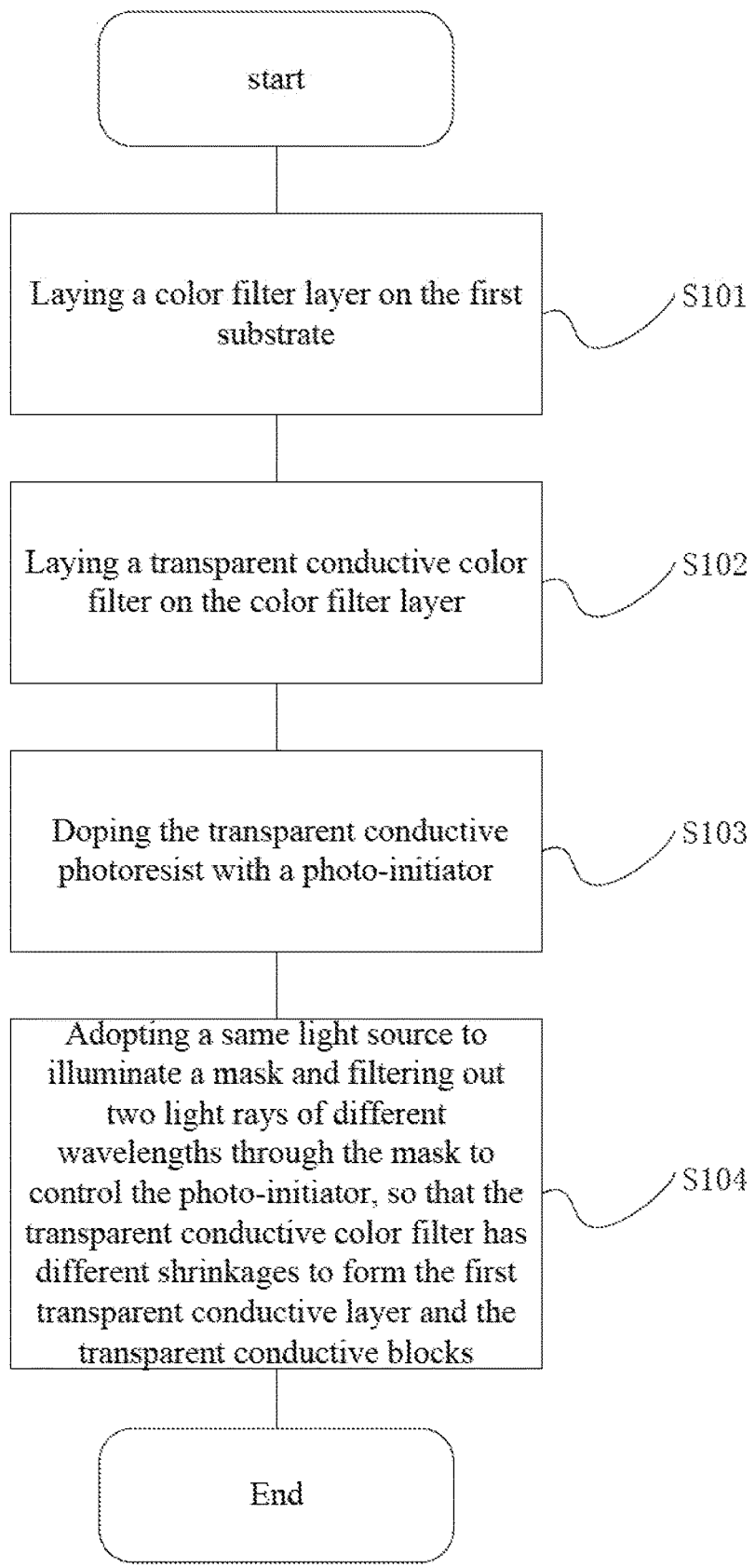
FIG. 13 is a flow chart of a manufacturing process for a display panel of an embodiment of the present application.

Specifically, as shown in FIG. 13, FIG. 13 is a specific flow chart of a manufacturing process for a display panel of an embodiment of the present application. The manufacturing process in FIG. 13 comprises a step S201, a step S202, a step S203 and a step S204. In combination with FIG. 10 and FIG. 11, the manufacturing process is specifically as follows.

In the step S201, a color filter layer 113 is laid on the first substrate 110.

In the step S202, the transparent conductive photoresist 130 is laid on the color filter layer 113.

In the step S203, the transparent conductive photoresist 130 is doped with the photo-initiator 140.

In the step S204, a same light source 300 is adopted to illuminate a mask 200, and two light ways of different wavelengths are filtered through the mask to control the photo-initiator, so that the transparent conductive photoresist has different shrinkages, forming the first transparent conductive layer and the transparent conductive blocks.

In embodiments of the present application, the transparent conductive photoresist is doped with the photo-initiator, the photo-initiator is used for cooperation with the light rays of a preset wavelength, and the photo-initiator and the transparent conductive photoresist have a cross-linking reaction through the illumination of the light rays of the preset wavelength to form different shrinkages. In the present application, the two light rays of the different wavelengths of the same light source penetrate through the mask, and the two different light rays respectively cooperate with the photo-initiator, so that the photo-initiator and the transparent conductive photoresist have the cross-linking reaction to form different degrees of the shrinkage, forming the first transparent conductive layer and the transparent conductive blocks, or forming the second transparent conductive layer and the conductive blocks. Therefore, embodiments of the present application can complete the first transparent conductive layer and the transparent conductive blocks, or complete the second transparent conductive layer and the conductive blocks in the same manufacturing process, thereby saving manufacturing processes, and facilitating material obtaining and production.

Specifically, in combination with FIG. 10, in FIG. 10, the color filter layer 113 is first laid on a first carrier 114 of the first substrate 110. The color filter layer 113 in the present embodiment includes but is not limited to the photoresist R, the photoresist G and the photoresist B. However, the transparent conductive photoresist 130 is laid on the color filter layer 113, and the transparent conductive photoresist 130 is doped with the photo-initiator 140. However, a light source 300 and a mask 200 illuminate the transparent conductive photoresist 130 and the photo-initiator 140. Specifically, the light source 300 emits a first light ray L1, and the first light ray L shines on the mask 200. The mask 200 filters two different light rays, i.e. a second light ray L2 and a third light ray L3. The second light ray L2 shines on the transparent conductive photoresist 130 and the photo-initiator 140 to control the photo-initiator, so that the transparent conductive photoresist has shrinkage to form the first transparent conductive blocks 112. The third light ray L3 shines on the transparent conductive photoresist 130 and the photo-initiator 140 to control the photo-initiator, so that the transparent conductive photoresist shrinks to form the first transparent conductive layer 111. Therefore, the first transparent conductive layer and the first transparent conductive blocks are formed in the same manufacturing process. However, the second substrate 120 and the first substrate 110 are assembled, so that the first transparent conductive blocks is electrical connected to the first transparent conductive layer and the second transparent conductive layer of the second substrate. Frame glue 150 is encapsulated at edges of the first substrate and the second substrate, so that a complete display panel 100 is formed.

In the present embodiment, the second transparent conductive layer is preferably made of the transparent conductive photoresist, thereby facilitating material obtaining and production. Of course, it shall be noted that the second transparent conductive layer in the present embodiment is not limited thereto. For example, the second transparent conductive layer may also be made of indium tin oxide.

This is a specific embodiment for arranging the transparent conductive blocks. It shall be noted that, the arrangement of the transparent conductive blocks is not limited thereto. For example, as shown in FIG. 11, in the FIG. 11, the transparent conductive photoresist and the photo-initiator are laid on the second carrier 122 of the second substrate 120 and the second transparent conductive layer 121 and the second transparent conductive blocks 123 are formed through the illumination of a light source 300 and a mask 200. The first substrate and the second substrate are assembled, so that the second transparent conductive blocks 123 may be in electrical connection with the first transparent conductive layer and the second transparent conductive layer. The difference between the FIG. 11 and the FIG. 10 is that the transparent conductive photoresist and the photo-initiator are laid on different substrates; or referring to FIG. 4 to FIG. 6, and referring to FIG. 7 and FIG. 9, no detailed description is made herein.

The first carrier and the second carrier may be glass substrates, and have good light transmission and convenient arrangement. Of course, it shall be noted that the first carrier and the second carrier in the present embodiment are not limited thereto. For example, the first carrier and the second carrier may be flexible substrates.

In the present embodiment, further, the first substrate 110 also comprises a first carrier 114 and a color filter layer 113. The color filter layer 113 is disposed on the first carrier 114, the first transparent conductive layer 111 is disposed on the color filter layer, and the plurality of spaced first transparent conductive blocks 112 protrude out of the first transparent conductive layer 111. The second substrate 120 also comprises a second carrier 122, a pixel electrode layer, data lines for charging the pixel electrode, and scan lines for controlling the pixel electrode, and the second transparent conductive layer 121 is disposed on the second carrier 122. The pixel electrode layer, the data lines and the scan lines are arranged in a display area of the display panel 100.

The pixel electrode is made of the transparent conductive photoresist 130. In embodiments of the present application, the pixel electrode is also made of the transparent conductive photoresist 130, so that the first transparent conductive layer 111, the second transparent conductive layer 121, the first transparent conductive blocks 112 and the pixel electrode are made of the transparent conductive photoresist 130, thereby saving manufacturing processes and further facilitating material obtaining and production.

Outer surfaces of the first transparent conductive blocks 112 are arc-shaped, and the sizes of the transparent conductive blocks 112 gradually increase from the top to the middle, and gradually decrease from the middle to the bottom. The transparent conductive blocks of the arc structure have better conduction. When the first substrate 110 and the second substrate 120 are assembled, the connection between the first transparent conductive blocks 112 of the arc structure and the second transparent conductive layer 121 is better. However, it shall be noted that the first transparent conductive blocks 112 in the present embodiment may also be arranged in other structures, such as a cylindrical structure, a conical structure, and the like.

The above display panel and the display panel formed by the above manufacturing process of the present application may be used in a display apparatus. The display apparatus further comprises a backlight module. The display apparatus may be a liquid crystal display apparatus and may also be an OLED display apparatus. The backlight module may be served as a light source for providing sufficient brightness and a uniformly distributed light source when the display apparatus in the embodiment of the present application is the liquid crystal display apparatus, and the backlight module in the present embodiment may be in a front-light type or a backlight type. It should be noted that, the backlight module in the present embodiment is not limited thereto.

The above contents are further detailed descriptions of the present application in combination with specific preferred embodiments. However, the concrete implementation of the present application shall not be considered to be only limited to these descriptions. For those ordinary skilled in the art to which the present application belongs, several simple deductions or replacements may be made without departing from the conception of the present application, all of which shall be considered to belong to the protection scope of the present application.

The invention claimed is:

1. A display panel, comprising:
a first substrate provided with a first transparent conductive layer;
a second substrate disposed opposite to the first substrate and provided with a second transparent conductive layer; and
a plurality of transparent conductive blocks spacedly positioned between the first transparent conductive layer and the second transparent conductive layer, wherein the transparent conductive blocks are electrically connected to the first transparent conductive layer and the second transparent conductive layer;
wherein the transparent conductive blocks are made from a same material as the first transparent conductive layer, or the transparent conductive blocks are made from a same material as the second transparent conductive layer; or the transparent conductive blocks are made from a same material as the first transparent conductive layer and the second transparent conductive layer; and the transparent conductive blocks are integrally funned with the first transparent conductive layer, or the transparent conductive blocks are integrally formed with the second transparent conductive layer, or the transparent conductive blocks are integrally formed with the first transparent conductive layer and the second transparent conductive layer;
wherein the first substrate comprises a color filter layer, and the first conductive layer is disposed on the color filter layer, and the plurality of transparent conductive blocks protrude out of the first transparent conductive layer, and are made from a same material as the first transparent conductive layer, and are integrally formed with the first transparent conductive layer;
wherein the first transparent conductive layer and the transparent conductive blocks are made of a transparent conductive photoresist and are formed in a same manufacturing process;
wherein the second transparent conductive layer is made of the transparent conductive photoresist;
wherein the second substrate comprises a pixel electrode layer, data lines for charging the pixel electrode and scan lines for controlling the pixel electrode, and the pixel electrode is made of the transparent conductive photoresist;
wherein outer surfaces of the transparent conductive blocks are arc-shaped, and sizes of the transparent conductive blocks gradually increase from the top to, the middle and gradually decrease from the middle to the bottom.

2. A display panel, comprising:
a first substrate provided with a first transparent conductive layer;
a second substrate disposed opposite to the first substrate and provided with a second transparent conductive layer; and
a plurality of transparent conductive blocks spacedly positioned between the first transparent conductive layer and the second transparent conductive layer, wherein the transparent conductive blocks are statically and electrically connected to the first transparent conductive layer and the second transparent conductive layer;
wherein the transparent conductive blocks are made from a same material as the first transparent conductive layer, or the transparent conductive blocks are made from a same material as the second transparent conductive layer; or the transparent conductive blocks are made from a same material as the first transparent conductive layer and the second transparent conductive layer; and the transparent conductive blocks are integrally formed with the first transparent conductive layer; or the transparent conductive blocks are integrally formed with the second transparent conductive layer; or the transparent conductive blocks are integrally fortified with the first transparent conductive layer and the second transparent conductive layer; and
wherein the transparent conductive blocks comprises the first semi-transparent conductive blocks and the second semi-transparent conductive blocks;
wherein the first semi-transparent conductive blocks and the first transparent conductive layer are integrally formed, and the second semi-transparent conductive blocks and the second transparent conductive layer are integrally formed.

3. The display panel according to claim 2, wherein the first transparent conductive layers is made of the transparent conductive photoresist; or the second transparent conductive layers is made of the transparent conductive photoresist; or the first transparent conductive layer and the second transparent conductive layer are made of the transparent conductive photoresist.

4. The display panel according to claim 2, wherein the first substrate comprises a color filter layer, and the first conductive layer is disposed on the color filter layer; and the plurality of spaced transparent conductive blocks protrude out of the first transparent conductive layer, and are made from a same material as the first transparent conductive layer, and are integrally formed with the first transparent conductive layer.

5. The display panel according to claim 4, wherein the first transparent conductive layer and the transparent conductive blocks are made of the transparent conductive photoresist and are formed in a same manufacturing, process.

6. The display panel according to claim 5, wherein the second transparent conductive layer is made of the transparent conductive photoresist.

7. The display panel according to claim 6, wherein the second substrate comprises a pixel electrode layer, data lines for charging the pixel electrode and scan lines for controlling the pixel electrode, and the pixel electrode is made of the transparent conductive photoresist.

8. The display panel according to claim 6, wherein outer surfaces of the transparent conductive blocks are arc-shaped, and sizes of the transparent conductive blocks gradually increase from the top to the middle and gradually decrease from the middle to the bottom.

9. The display panel according to claim 6, wherein the transparent conductive blocks are of cylindrical structures.

10. The display panel according to claim 6, wherein the transparent conductive blocks are of conical structures.

11. The display panel according to claim 2, wherein the second substrate comprises a pixel electrode layer, data lines for charging the pixel electrode and scan lines for controlling the pixel electrode, and the pixel electrode is made of the transparent conductive photoresist.

12. The display panel according to claim 2, wherein outer surfaces of the transparent conductive blocks are arc-shaped, and sizes of the transparent conductive blocks gradually increase from the top to the middle and gradually decrease from the middle to the bottom.

13. The display panel according to claim 2, wherein the transparent conductive blocks are of cylindrical structures.

14. The display panel according to claim 2, wherein the transparent conductive blocks are of conical structures.

15. The display panel according to claim 2, wherein the first transparent conductive layer, the first semi-transparent conductive blocks, the second transparent conductive layer and the second semi-transparent conductive blocks are made of the transparent conductive photoresist.

16. A manufacturing process for a display panel, comprising the following steps:
laying a transparent conductive photoresist on a first substrate or a second substrate; and
processing the transparent conductive photoresist into a first transparent conductive layer or a second transparent conductive layer, and transparent conductive blocks with the first transparent conductive layer or the second transparent conductive layer through a same mask technology; and wherein the transparent conductive blocks are statically and electrically connected to the first transparent conductive layer and the second transparent conductive layer; and
wherein the step of laying the transparent conductive color filter on the first substrate or the second substrate comprises:
laying a color filter layer on the first substrate; and
laying the transparent conductive color filter on the color filter layer of the first substrate;
wherein the step of processing the transparent conductive color filter into the first transparent conductive layer or the second transparent conductive layer and the transparent conductive blocks integrally formed with the first transparent conductive layer or the second transparent conductive layer through the same mask comprises:
doping the transparent conductive color filter with a photo-initiator; and
illuminating a mask using a same light source and filtering out two light rays of different wavelengths through the mask to control the photo-initiator, forming the transparent conductive color filter of different shrinkages, and forming the first transparent conductive layer and the transparent conductive blocks.

* * * * *